2,949,130
MIXING VALVE

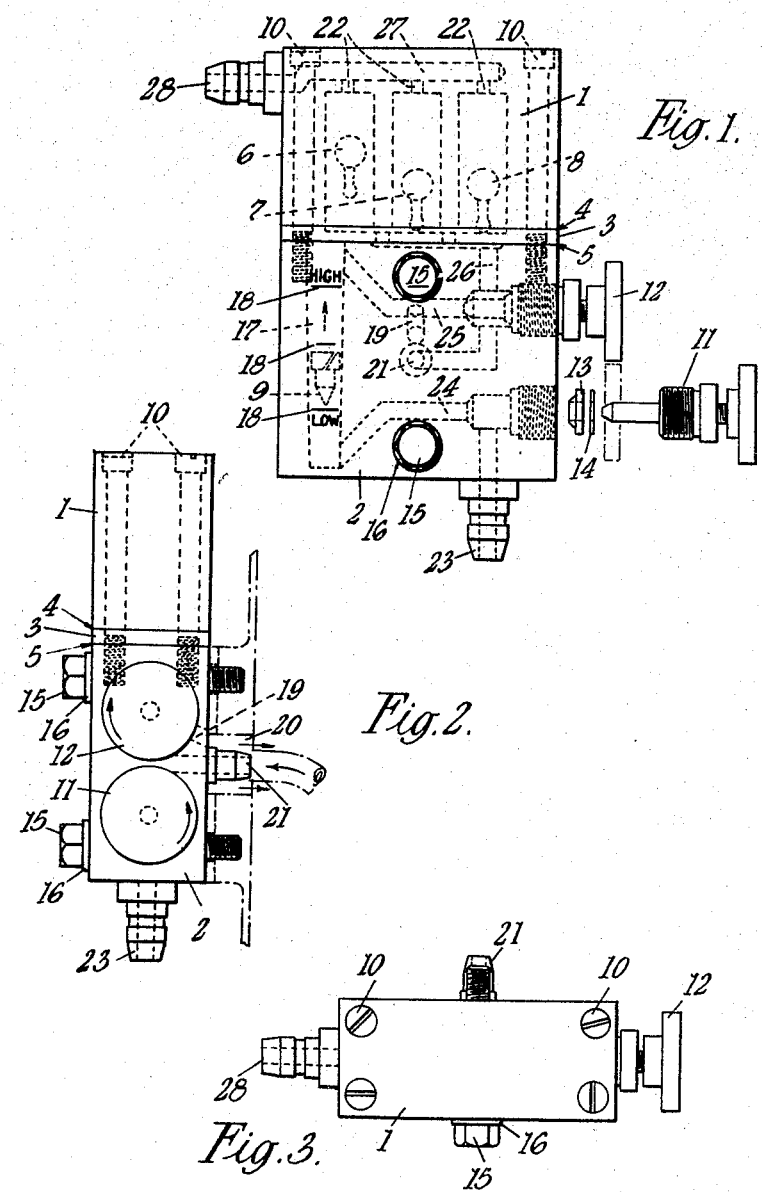

Philip Henry Knight, Potters Bar, and Roland John O'Donovan, Wellington, England, assignors to Bell Brothers (Domestic) Limited, Wellington, England Filed June 21, 1956, Ser. No. 592,918

7 Claims. (Cl. 137—552)

This invention relates to mixing valves for the admixture of liquids of different specific gravity and the object of the invention is to provide a valve with which it is possible to produce a liquid resulting from the admixture of a predetermined dilution, for example, brine for use in electrolytic cells, for the regeneration of water softeners and for similar purposes.

Hitherto, although it has been possible to measure the total rate of flow by means of an indicator, the dilution of a saturated solution issuing from a solutioniser has been rather indeterminate and a matter of trial and error to find the optimum setting, as the amount of liquid flowing in a closed system is relatively small and does not permit accurate sampling for the specific gravity to be measured, and it is one object of the invention to provide means of measuring the flow combined with means for measuring the specific gravity of the liquid after dilution, thus enabling immediate adjustment to be carried out to obtain a delivery of solution of the required density.

The invention consists in a mixing valve comprising in combination a liquid inlet flow control valve, a liquid flow rate indicator, a saturation control valve and a specific gravity indicator, all connected in series with one another, and an inlet and outlet connection on opposite sides of the saturation control valve and adapted to be connected to a closed saturation vessel.

The invention further consists in that the specific gravity indicator comprises a group of float chambers having floats of different specific gravity.

In one method of carrying the invention into effect the apparatus comprises a transparent block, or a block with transparent windows, of material which is inert to the action of the liquids concerned and comprising a flow path for water, in which path are interposed a control valve and a metering tube and bobbin of the rotameter type, so arranged that the rate of flow controlled by the operation of the valve is indicated by the position of the bobbin in the metering tube. After passing from the metering tube, the water is led through a suitable opening into a closed vessel from which the heavier liquid is displaced, which in the case of brine, for example, is formed as a saturated solution by the flow of the water through a bed of common salt in the closed salt saturation vessel.

A portion of the water flow may be bypassed into the brine passage by the operation of a control valve, thus producing a greater or less dilution of the brine.

The flow of brine from the solutionising tank with the diluting water is led to a passage in the apparatus communicating with a requisite number of tubes or tubular cells, each containing a float of known and differing specific gravity. The strength of the brine is indicated by the rising of the appropriate float or series of floats. The specific gravity float chambers discharge into a common collecting pipe from whence the solution of the requisite strength as determined by specific gravity is led to the point of application.

The accompanying drawing shows, by way of example only, one form of embodiment of the invention in which Figure 1 is a side elevation,
Figure 2 is an end elevation, while
Figure 3 is a plane view.

The device is constructed from a block of transparent synthetic resin or other suitable transparent material, inert to the action of brine, the necessary passages being moulded or drilled in the solid as required. It may be convenient to divide the block into several parts 1, 2 and 3 for convenience of construction and connected by water-tight joints 4 and 5 and held together by bolts 10. The water flow is controlled by a needle valve 11 of suitable design, furnished with a stuffing gland 13, and suitable hydraulic packing 14. The rate of flow indicator consists of a bobbin 9 of conical or other suitable shape, turbinated if necessary, effecting rotation to ensure free vertical movement in a vertical bore 17 in the block in which the liquid travels upwards as indicated by the arrows. The rate of flow may be indicated by graduations 18 between minimum and maximum flow or by a calibration in units of quantity per unit of time. The water is led from the indicator to the salt saturator vessel (not shown) through a branch 19 communicating with an annular opening 20 formed around the brine inlet tube 21 from the vessel to the device. The flow of water in the apparatus for diluting the brine is controlled by a needle valve 12 which may be similar to that already described and from which the dilute solution passes into three hydrometer chambers, each formed as a vertical bore towards the top of the block, and each connected to an outlet 22, the floats 6, 7 and 8 in the chambers being constructed such as to rise for example with salt solutions of 5 percent, 10 percent and 15 percent respectively. It may be arranged for example that when the first float rises a 5 percent salt solution is passing to the outlet of the device; when the first and second floats rise the strength of the solution is 10 percent, and when all three floats rise the strength of the solution is 15 percent.

The apparatus is conveniently constructed with the water inlet entering from the bottom of the block at 23 to an annular space around the needle of the flow control valve 11 which is mounted in a horizontal bore to one side of the block. The water leaves this valve by a horizontal passage 24 and enters the bottom of the vertical rate of flow indicator bore 17 and leave the top of this by a further horizontal bore 25 to the needle of a second valve 12, i.e. the dilution control valve, which is mounted in a bore parallel to and above the flow control valve. The dilution control valve has an annular space around the needle from which a passage 26 leads upwards and then horizontally to the bottom of a range of float chambers each containing a float 6, 7, 8 of different specific gravity as above described. The outlet of each chamber connects to a common horizontal outlet channel 27 leading to a salt solution outlet 28.

A branch 19 is provided in the block by way of a bore from the bore connecting between the top of the flow indicator tube and the dilution control valve and this branch feeds the water to the saturation vessel (not shown), while the inlet 21 from the saturation vessel is connected to the annular space around the needle of the saturation control valve 12. It can thus be seen that there are two ways by which the water leaving the flow indicator tube 17 may reach the float chambers 6, 7 and 8, either by way of the saturation vessel or by the saturation control valve 12 which acts to by-pass the vessel. When the valve is closed the maximum saturation is obtained, while by progressively opening the valve the degree of saturation of the liquid gets progressively less and less.

Fixing bolts 15 with washers 16 may be provided for attaching the device to a facing on the salt saturator or other liquid containing vessel.

It is to be understood that the above description is by way of example only and that the location of the valves and passages and the number of float chambers may be varied to suit particular requirements and other details for carrying the invention into effect may be varied without departing from the scope of the invention.

We claim:

1. A mixing device for control of the degree of saturation of a solution displaced from an enclosed vessel, said device comprising a body of transparent material, first liquid inlet passage means in said body for the diluent for the solution, a flow rate indicating means inserted in said inlet passage whereby by measuring the rate of flow of the solvent the flow rate of the solution discharged from the device is indicated, second passage means in said body arranged to receive the outflow of liquid diluent from said flow rate indicator means, said second passage means being bifurcated, one bifurcation of said second passage means constituting means adapted to be connected to said enclosed vessel to convey a portion of the flow of liquid diluent from said flow rate indicating means to said enclosed vessel whereby saturated solution may be displaced from said enclosed vessel, specific gravity indicating means in said body, the other bifurcation of said second passage means constituting means to convey the liquid diluent to said specific gravity indicating means, an adjustable valve element in said other bifurcation of said second passage means, a third passage means in said body adapted to be connected to said enclosed vessel and connected to said other bifurcation of said second passage means between said adjustable valve element and said specific gravity means whereby saturated solution from said vessel is injected into said diluent to form a solution, the degree of saturation of which is to be controlled, and a fourth enclosed passage means in said body leading from said specific gravity indicating means to form a discharge passage from the device.

2. A mixing device comprising a body of material provided with bores forming chambers and passages therein including a liquid inlet passage, a liquid flow rate indicator chamber, a valve chamber, at least one specific gravity indicator chamber, and a liquid outlet passage all connected together by passages in series in the order recited, flow rate indicator means, adjustable flow valve means, and specific gravity indicator means in their respective chambers, a first branch passage formed in said body connected to the passage between said flow rate indicator chamber and said valve chamber and extending to a wall of said body of material, and a second branch passage formed in said body connected to the passage between said valve and said specific gravity indicator chamber and extending to the same wall of said body of material as said first branch passage, said first and second branch passages adapted to be placed in free communication with a closed chamber of a saturated solution when the device is in use, said body being formed in three parts, a first block in which said flow rate indicator, said adjustable valve and said first and second branch passages are all housed, a second block in which said specific gravity indicator is housed, and a third block of material between said first and said second blocks which includes bores forming the passageway between said adjustable valve chamber and said specific gravity chamber, and means vertically securing said three blocks together to form a unitary device.

3. A mixing device as claimed in claim 2 in which a stop valve means is provided in the passage between said liquid inlet and said liquid flow rate indicator.

4. The mixing device of claim 2, in which said specific gravity indicator chamber is demountable from the remainder of said body for the purpose of substituting a specific gravity indicator of a different range to suit liquids of different specific gravity.

5. The mixing device of claim 2, in which a plurality of specific gravity indicator chambers is provided and the specific gravity indicator comprises a plurality of floats of different specific gravity.

6. The mixing device of claim 2, in which the flow rate indicator comprises a turbinated bobbin and the liquid flow rate indicator chamber is a vertical bore in said body.

7. A mixing device comprising a body of material provided with bores forming chambers and passages therein including a liquid inlet passage, a liquid flow rate indicator chamber, a valve chamber, at least one specific gravity indicator chamber, and a liquid outlet passage all connected together by passages in series in the order recited, flow rate indicator means, adjustable flow valve means, and specific gravity indicator means in their respective chambers, a first branch passage formed in said body connected to the passage between said flow rate indicator chamber and said valve chamber and extending to a wall of said body of material, and a second branch passage formed in said body connected to the passage between said valve and said specific gravity indicator chamber and extending to the same wall of said body of material as said first branch passage, said first and second branch passages adapted to be placed in free communication with a closed chamber of a saturated solution when the device is in use, said body being formed in three parts, a first block in which said flow rate indicator, said adjustable valve and said first and second branch passages are all housed, a second block in which said specific gravity indicator is housed, and a third block of material between said first and said second blocks which includes bores forming the passageway between said adjustable valve chamber and said specific gravity chamber, and means vertically securing said three blocks together to form a unitary device, at least part of said blocks being transparent whereby said flow rate indicator and said specific gravity indicator can be viewed.

References Cited in the file of this patent

UNITED STATES PATENTS

| | | |
|---|---|---|
| 1,606,921 | Bowerman | Nov. 16, 1926 |
| 2,137,755 | Glynn | Nov. 22, 1938 |
| 2,226,954 | Thorold | Dec. 31, 1940 |
| 2,258,023 | McKernon | Oct. 7, 1941 |
| 2,311,181 | Bowen | Feb. 16, 1943 |
| 2,472,090 | Brewer | June 7, 1949 |

FOREIGN PATENTS

| | | |
|---|---|---|
| 25,761 | Great Britain | June 20, 1907 |